Dec. 2, 1958   J. W. STILES   2,862,633
CARTON UNLOADER
Filed Nov. 15, 1955   8 Sheets-Sheet 1
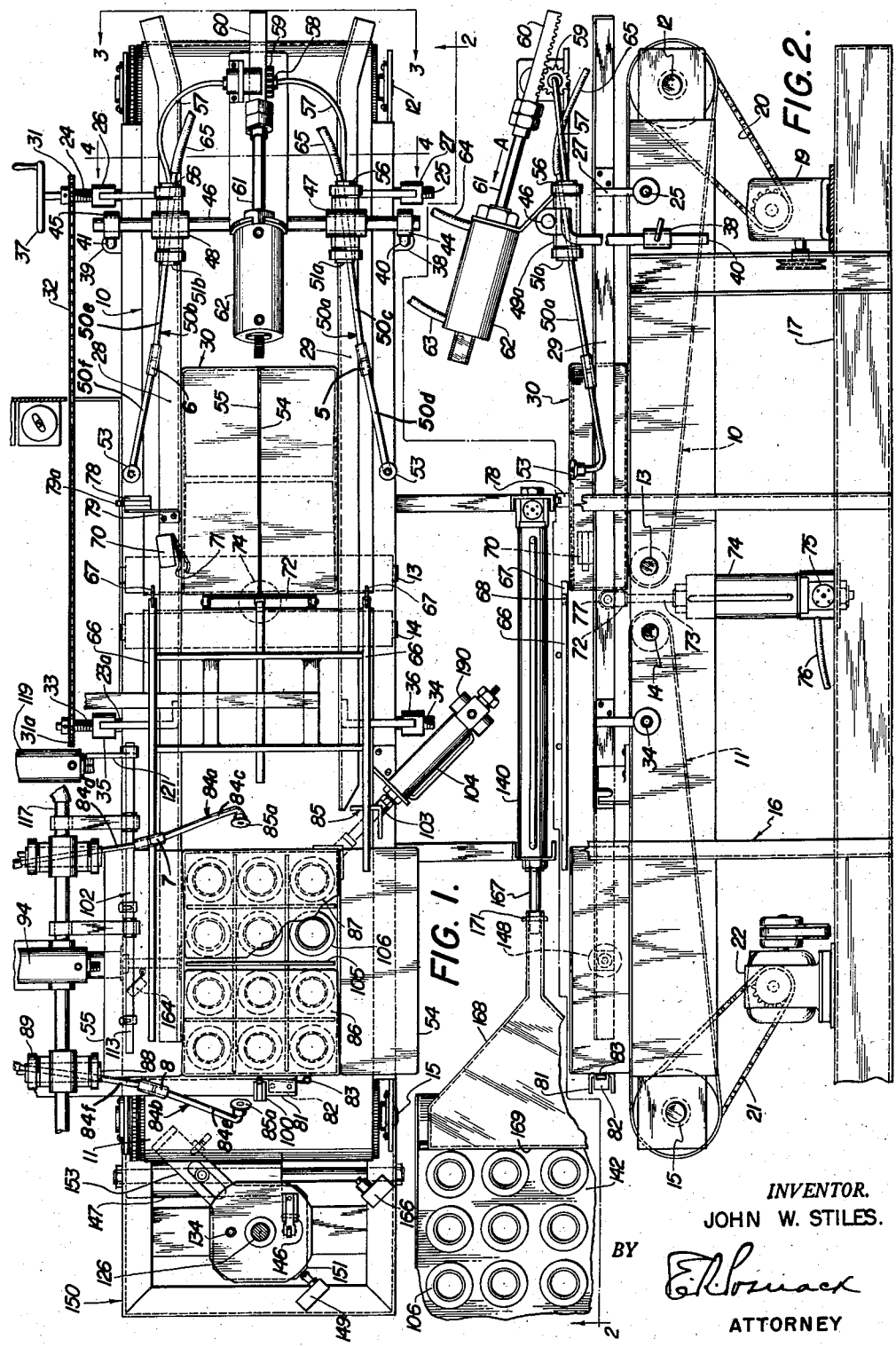
INVENTOR.
JOHN W. STILES.
BY
ATTORNEY Dec. 2, 1958 J. W. STILES 2,862,633
CARTON UNLOADER
Filed Nov. 15, 1955 8 Sheets-Sheet 2

INVENTOR.
JOHN W. STILES.
BY
ATTORNEY

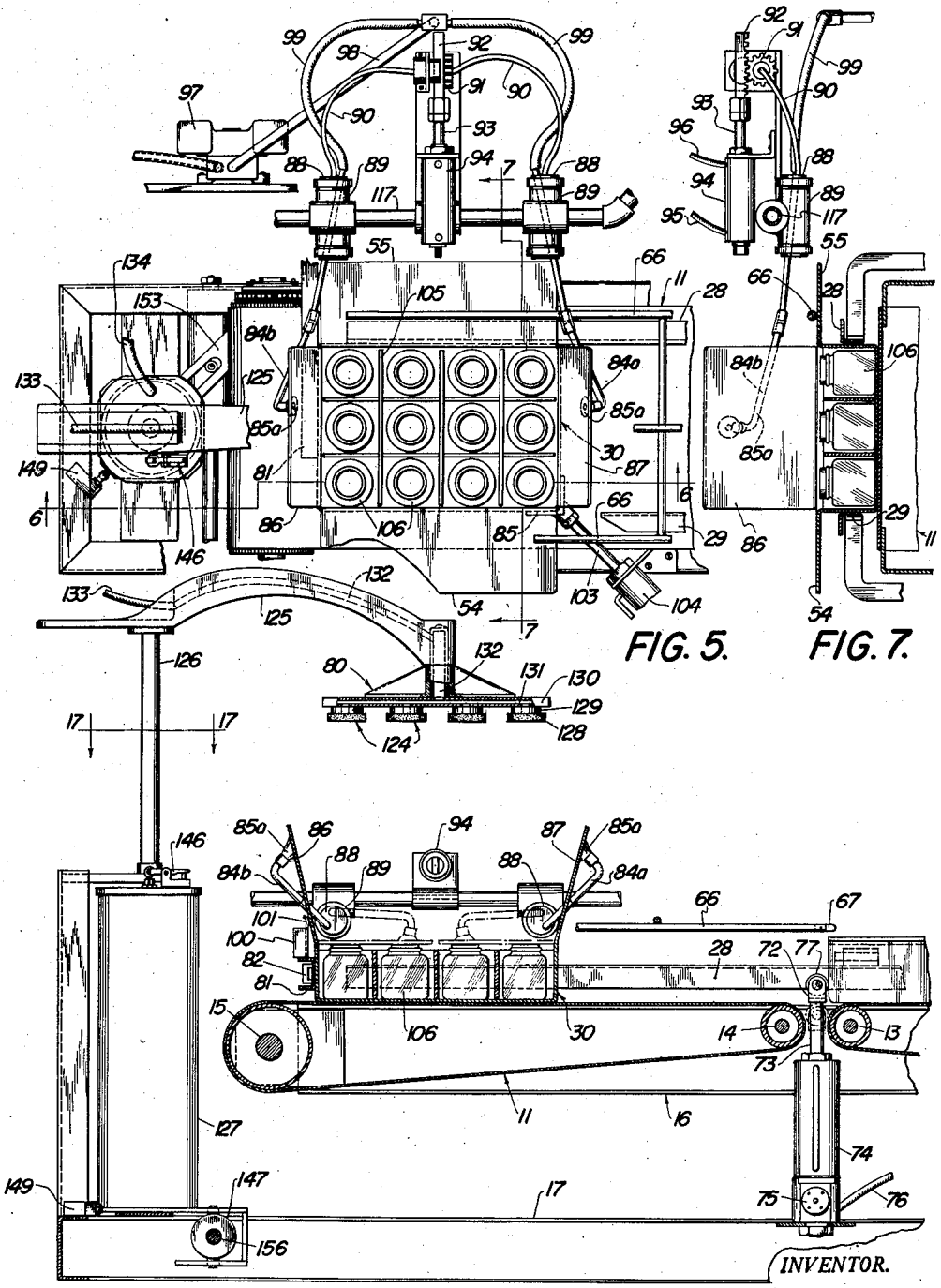

Dec. 2, 1958   J. W. STILES   2,862,633
CARTON UNLOADER
Filed Nov. 15, 1955   8 Sheets-Sheet 4

INVENTOR.
JOHN W. STILES.
BY
ATTORNEY

Dec. 2, 1958    J. W. STILES    2,862,633
CARTON UNLOADER
Filed Nov. 15, 1955    8 Sheets-Sheet 5

INVENTOR.
JOHN W. STILES.
BY
ATTORNEY

Dec. 2, 1958    J. W. STILES    2,862,633
CARTON UNLOADER
Filed Nov. 15, 1955    8 Sheets-Sheet 6
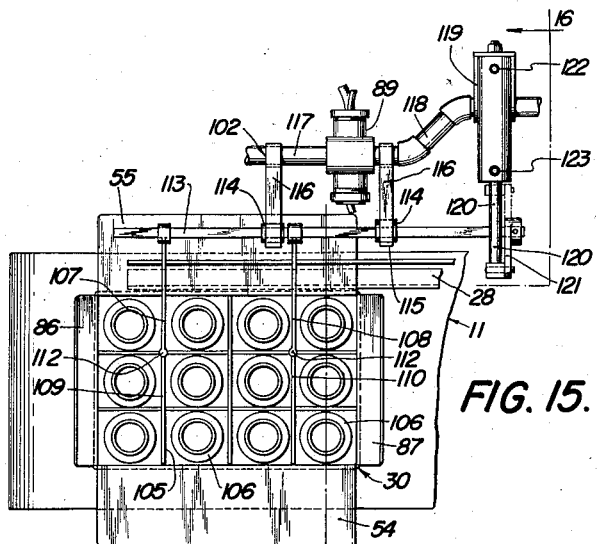
FIG. 15.
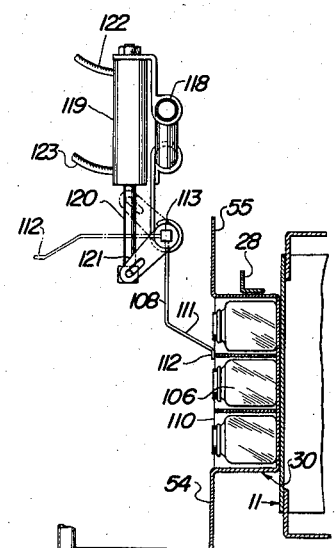
FIG. 16.
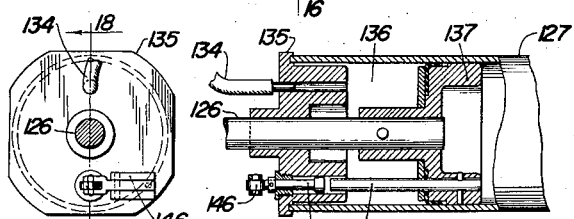
FIG. 17.   FIG. 18.
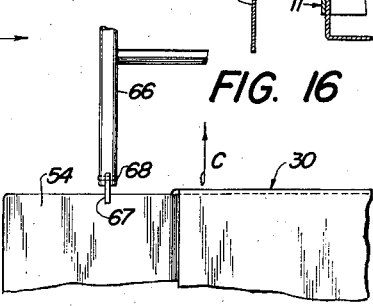
FIG. 20.
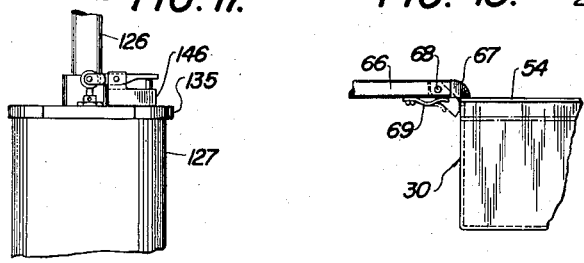
FIG. 19.   FIG. 22.
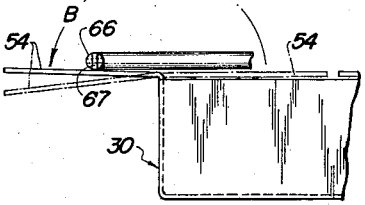
FIG. 21.
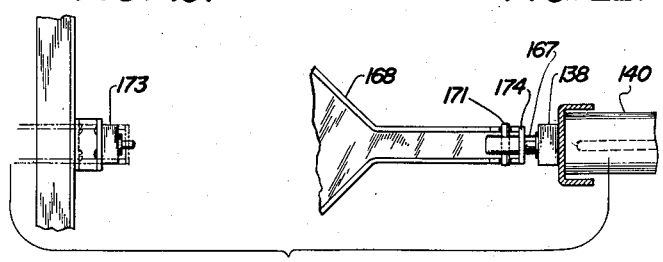
FIG. 23.
INVENTOR.
JOHN W. STILES.
BY
ATTORNEY Dec. 2, 1958

J. W. STILES 2,862,633

CARTON UNLOADER

Filed Nov. 15, 1955

INVENTOR.
JOHN W. STILES.
BY
ATTORNEY

Dec. 2, 1958

J. W. STILES 2,862,633

CARTON UNLOADER

Filed Nov. 15, 1955

• COMMON
⊙ NORMALLY CLOSED
○ NORMALLY OPEN

INVENTOR.
JOHN W. STILES.
BY

ATTORNEY

United States Patent Office 2,862,633
Patented Dec. 2, 1958

2,862,633

CARTON UNLOADER

John W. Stiles, Miami, Fla.

Application November 15, 1955, Serial No. 547,002

16 Claims. (Cl. 214—309)

This invention relates to carton unloaders—more particularly to an apparatus for unloading a plurality of container units, such as bottles and jars, from a carton upon a conveyor apparatus, such as an unscrambler adapted to feed the units to filling, capping, labelling or other processing stations.

Conventional unloading devices have generally not been fully automatic, because of complications arising from different sizes and shapes of the units, different proportions and capacities of cartons, and the need for individual adjustments to the different unpacking and processing operations. Under present high-speed conditions, especially where unloading operations involve more than ten cartons per minute, several operators are required to be employed to dump the contents of the cartons onto the unscrambling or other conveying apparatus, thereby not only involving a high labor cost, but also introducing the uncertainties connected with errors in human judgment and handling.

Where attempts have been made to mechanize the unloading operations, certain other difficulties have been encountered, thereby offsetting the advantages of automatic operation. Such disadvantages include, among others, the need to introduce supplementary mechanisms because of the limitations of the mechanical unloading apparatus, other high cost factors, and inadequate handling of broken container units. More specifically, certain of such conventional mechanisms require the carton to be packed upside-down, whereafter the entire carton must, by supplementary apparatus, be rotated 180° about a horizontal axis to bring the units right-side up, so they may be properly positioned for conveying to processing stations. Furthermore, in such conventional automatic unloaders no adequate provision is made for the handling of broken or cracked fragile units, so that such broken or cracked units are necessarily unloaded onto the unscrambler or other conveyor apparatus. This requires a shut-down or other interruption of the conveyor that receives the broken units, in order to remove them before they reach the processing stations. It is not uncommon for such an interruption to occur once every twenty cases, resulting in considerable loss of time, with corresponding increase in cost—in addition to the resultant hazard of accidental injury to the operator removing fragments of the broken units.

Moreover, in conventional mechanical unloaders, the entire mechanism must be pre-set, so that the various unloading and subsequent operations will be synchronized during the entire cycle of operations in accordance with the speed of unloading and processing, the shape, proportions, and numbers of units in the container, etc. Such synchronization and timing is generally complicated, requiring frequent skilful adjustments to meet different conditions. Moreover, breakdowns make it difficult to locate at which point of the complicated synchronized set-up the cause therefor lies.

It is within the contemplation of my invention to provide an automatic unloader, of the category above-described, which will effectively perform high-speed operations, without any of the above-mentioned shortcomings of manual or conventional mechanical unloaders.

Specifically, it is an objective of this invention to reduce the labor cost of unloading to a minimum, and to permit the unloading operation to be performed automatically, at a high rate of speed, and with relative ease of adjustment to meet various conditions.

It is another important object of this invention to eliminate the need for pre-setting of the apparatus in accordance with synchronized time relationship of the various components, as is required with conventional apparatus—an objective which is accomplished by my invention, in a novel manner, in which the carton itself sets into motion subsequent operative steps as the carton advances. By the method of my invention the carton itself sets up the cycle of operations, and causes the actuation of the operative mechanisms. And in this aspect of my invention it is a further object to reduce adjustments to a minimum—to a simple adjustment to provide for different sizes of cartons, and another simple adjustment of an infeed section to correspond with the capacity of the processing mechanism towards which the unscrambler or other conveyor conducts the units.

It is also within the contemplation of this invention to provide a simple method of loading only usable units, and leaving cracked or broken units in the carton; whereby there will be no need to shut down or otherwise interrupt either the unloading mechanism or the unscrambling or other conveyor fed by the unloader. In the accomplishment of this objective it is my further object to provide effective vacuum means for lifting the units out of their cartons, and delivering them to a suitable platform from which they are moved on to the takeaway mechanism. Another object, in this connection, is to provide a vacuum head which may be adapted for lifting container units in either inverted or right-side-up position, and which may readily be interchanged with other heads for operative use with units of different sizes, types and arrangement.

Among other objectives of my invention are the following: to effect the automatic opening of the flaps of cartons as such cartons advance along the apparatus; to move empty cartons away from the apparatus; to enable the vacuum means to suck out dust accumulated within the container units; to enable the pinpointing of any breakdown during the advance of the carton, thereby enabling corrections readily to be made and preventing any jam-up at the point of trouble.

It is also within my contemplation to provide air control means for operating various components of the apparatus, and to provide a readily fabricated structure adapted to perform the functions hereinabove described.

Other objects, features and advantages will appear from the drawings and the description hereinafter given.

Referring to the drawings,

Fig. 1 is a plan view of the apparatus of a preferred form of my invention, a closed carton being shown in place at the first station, a partially opened carton at an advanced station, and a group of container units on the unloading platform preparatory to being pushed off, fragments being removed for clarity, the carton-holding clamp being shown in dot-dash lines in its holding position.

Fig. 2 is a side elevation of Fig. 1, looking in the direction of arrows 2—2, portions being removed for clarity.

Fig. 5 is a fragmentary plan view of the rear portion of the apparatus shown in Fig. 1, but showing the carton in its fully opened position, the clamp being shown in its carton holding position, and the end flap openers being shown in their respective retracted positions holding the end flaps in their respective open positions.

Fig. 6 is a fragmentary sectional elevation of Fig. 5 taken substantially along line 6—6, the end flap openers being shown by dot-dash lines in their respective projected positions engaging the end flaps prior to the opening operation.

Fig. 7 is a fragmentary section of Fig. 5 taken substantially along the line 7—7.

Figure 8:
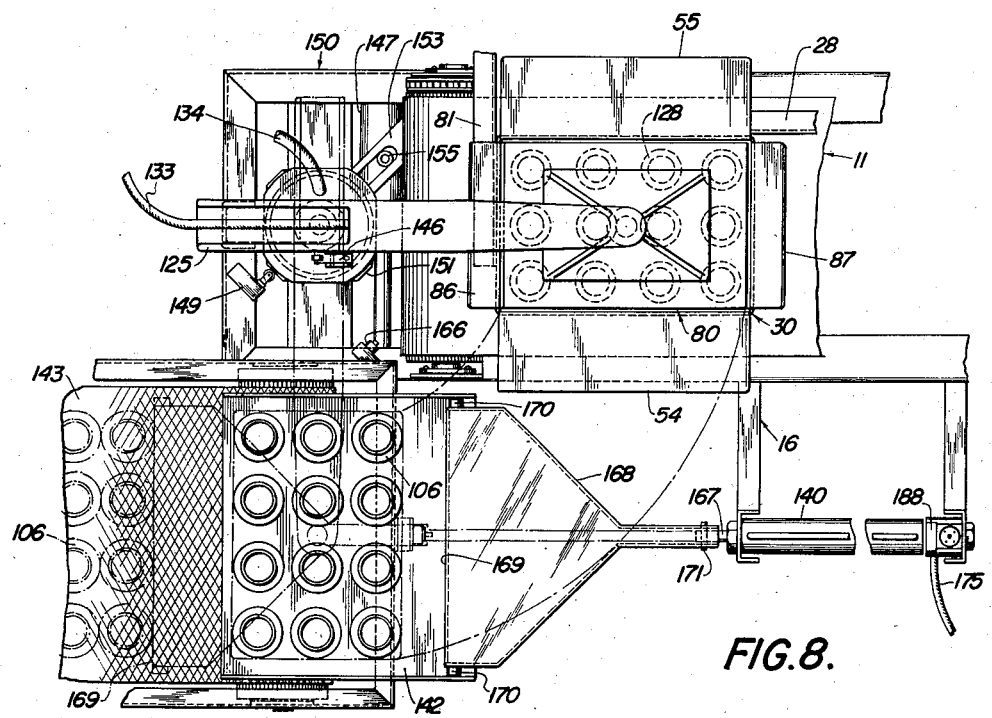

Fig. 8 is a fragmentary plan view of the rear portion of the apparatus showing the lifting head in full lines in its position prior to its operative rotation, and showing a group of twelve container units on the unloading platform after the transferring operation, the dot-dash lines showing the lifting head and supporting arm therefor in their operatively rotated positions, and also showing the push-off member in its operatively advanced position with the units pushed on to the discharge belt.

Figure 9:
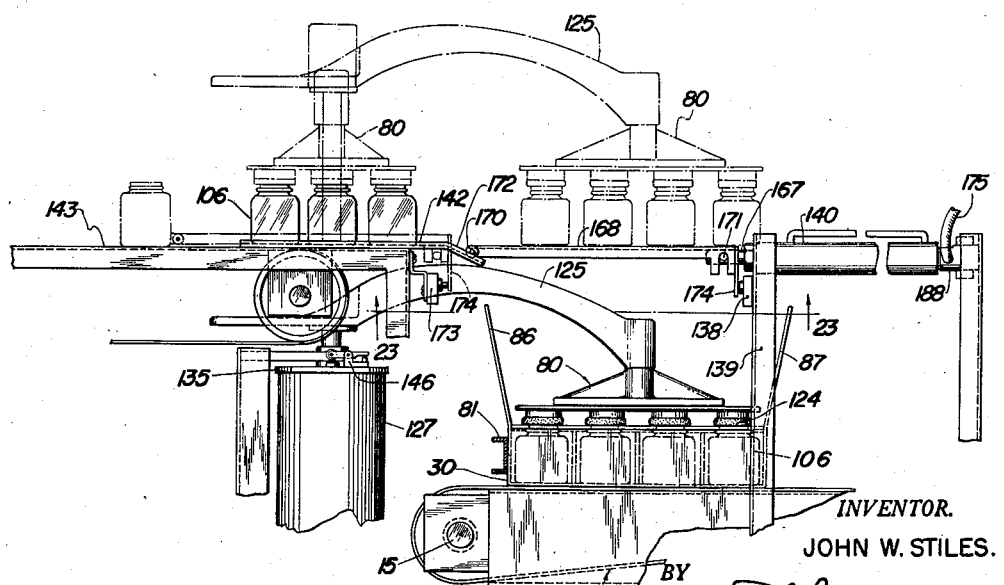

Fig. 9 is a fragmentary elevational view of Fig. 8, the lifting head being shown in its lowered position in engagement with the container units within the carton, the dot-dash lines showing the lifting head in its raised position just prior to and also after the turning and transferring operations, and also showing the push-off member in its operatively projected position, transferred container units being also represented by dot-dash lines.

Figure 11:
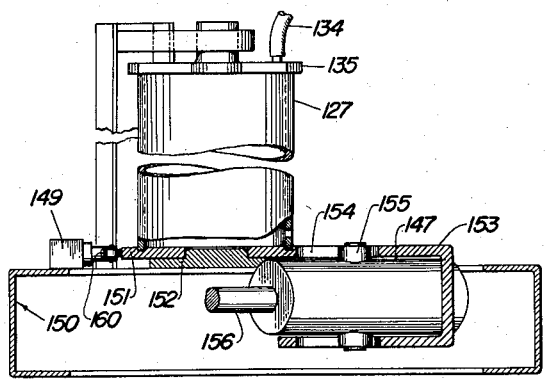
Figure 10:
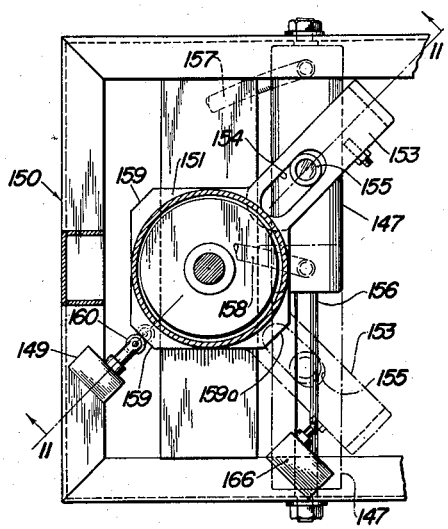

Fig. 10 is a somewhat enlarged sectional plan of the main cylinder portion of the apparatus illustrated in Figs. 8 and 9, the section being taken substantially along line 10—10 of Fig. 11, the dot-dash lines showing the position of certain of the parts after a 90° rotation of the main cylinder.

Fig. 11 is a fragmentary section of Fig. 10 taken substantially along line 11—11.

Figure 12:
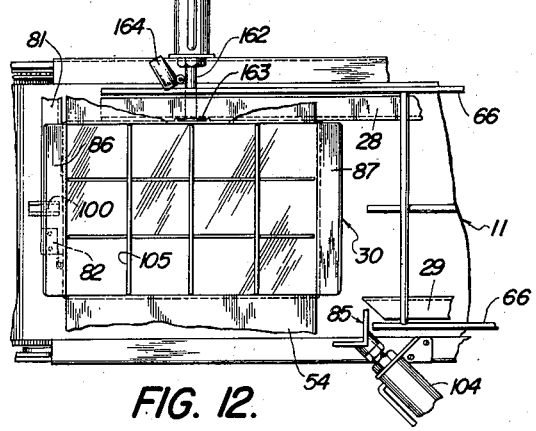

Fig. 12 is a fragmentary plan view of the empty carton ejective device, the carton being shown in place before the ejecting operation.

Figure 13:
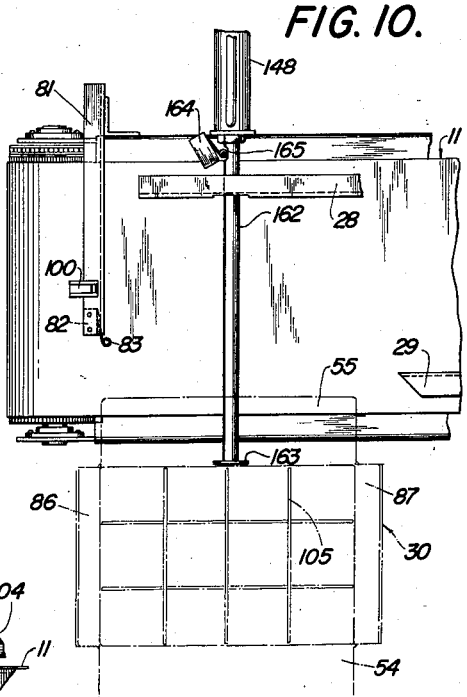

Fig. 13 is a view substantially like that of Fig. 12, but showing the ejector in its operatively projected position, with the empty carton shown by dot-dash lines in position after being removed from the conveyor.

Figure 14:
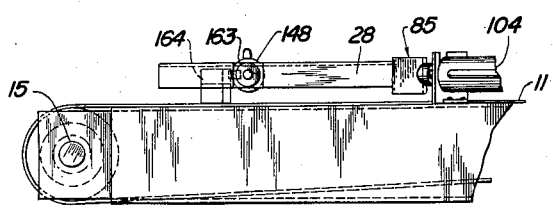

Fig. 14 is a fragmentary elevational view of Fig. 12 with the carton removed.

Fig. 15 is a fragmentary plan view of a portion of the apparatus showing the hold-down mechanism for the carton partition insert, the carton being shown in open position.

Fig. 16 is a transverse section of Fig. 15 taken along line 16—16, showing the hold-down mechanism in elevational view.

Fig. 17 is a fragmentary section of Fig. 6 taken along lines 17—17.

Fig. 18 is a part sectional, part elevational view of Fig. 17, the section being taken substantially along line 18—18.

Fig. 19 is a fragmentary side elevational view of Fig. 17.

Fig. 20 is a fragmentary plan view of a portion of the apparatus, showing the latch and holding mechanism for keeping the side flaps in open position.

Fig. 21 is a fragmentary side elevational view of Fig. 20.

Fig. 22 is a fragmentary end elevational view of Fig. 20 looking substantially in the direction of arrows 22—22.

Fig. 23 is a fragmentary sectional bottom view of Fig. 9 taken along line 23—23, showing the container unit push-off mechanism.

Figure 24:
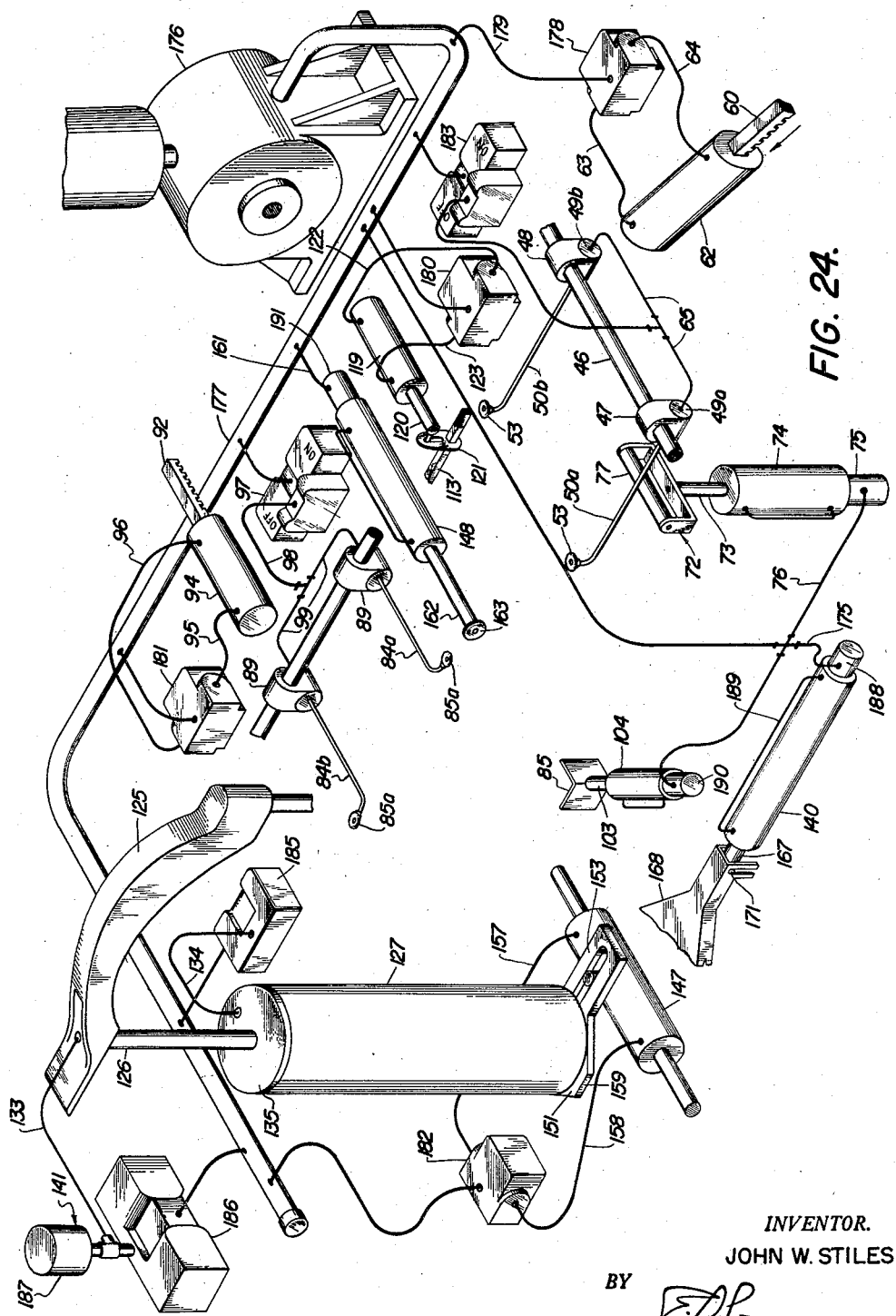

Fig. 24 is a schematic perspective view of the main components of the apparatus, illustrating the arrangement of the solenoid valves, actuating cylinder members and the piping connections therefor.

Figure 25:
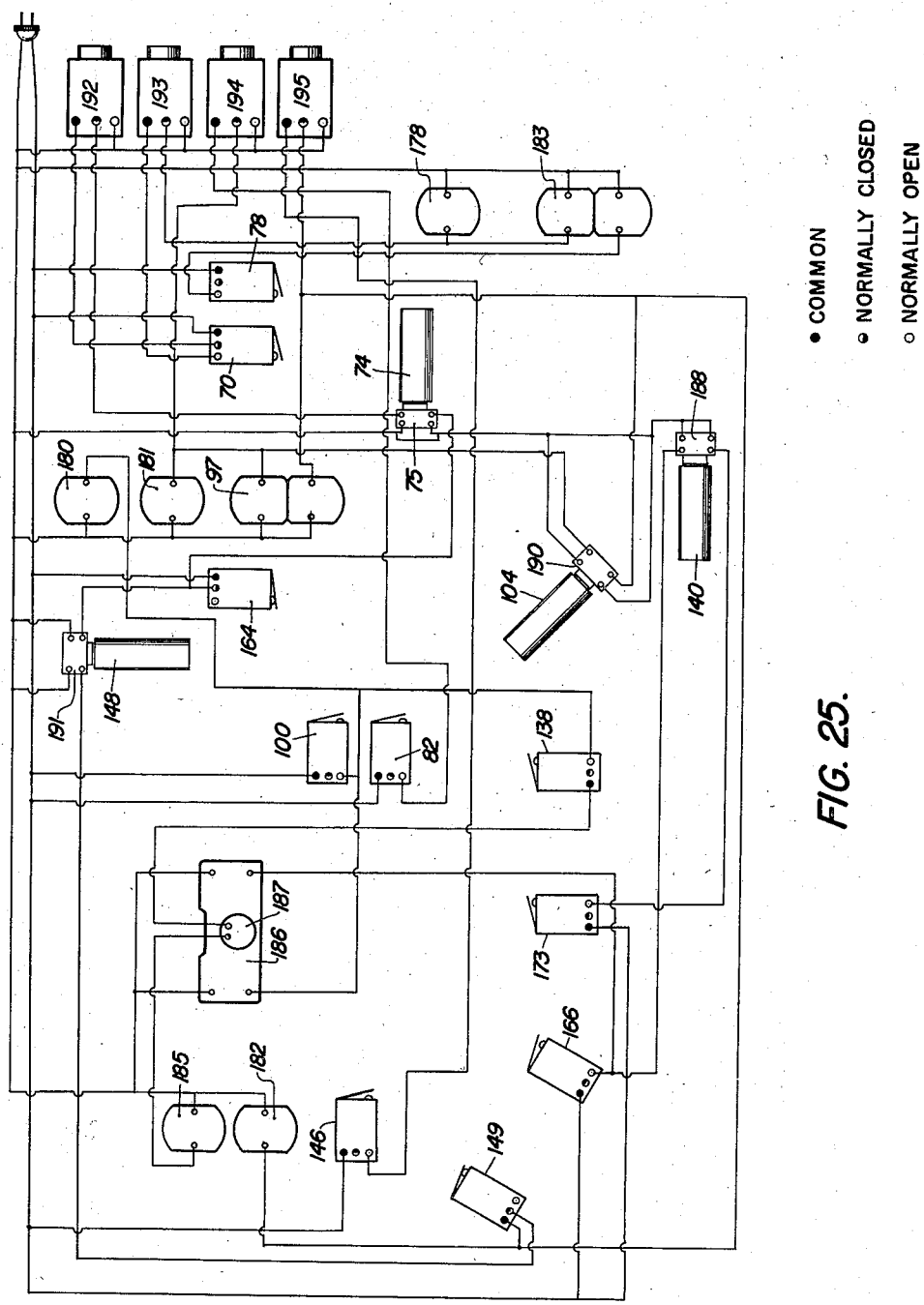

Fig. 25 is a wiring diagram of electrical connections between the microswitches, time-delay-relays, and solenoids employed in the apparatus above-described.

The form of apparatus illustrated comprises an arrangement of conveyors, carton flap openers, suction means for removing container units from the cartons, means for transferring said units to an unloading platform and various auxiliary components—all operated by electromechanical vacuum devices brought into play by the cartons during their progress through the apparatus.

According to the illustrated method of my invention, a carton loaded with container units and with closed flaps is placed right side up on an initial conveyor which advances it to a first station where it is halted by a retractable stop member, the latter holding it stationary while certain suction arms open the carton's side flaps—the movement of the carton towards the said stop actuating a microswitch which in turn causes the actuation of said arms, the opening of the flaps engaging another microswitch to cut off the suction in said arms, thereby freeing said side flaps. The stop is then retracted, whereupon the carton advances onto a second conveyor, the latter moving the carton rapidly to a second station—the carton emptying position. In this position the carton contacts a microswitch which causes a number of other operations to be performed, one being the actuation of two other suction arms to open the inside end flaps of the carton, said flaps engaging another microswitch which actuates a vacuum lifting head. This head is lowered over the open carton, there being thereon a plurality of suction caps which engage the open container units—the air from said units being exhausted whereby they are held by suction in firm engagement with said head. Thereafter the head is raised and rotated through an angle of 90° to a position where the container units are disposed over an unloading platform. The suction mechanism is then actuated to cause a release of the container units, whereupon the latter are deposited on said unloading platform. Thereafter a vacuum operated push-off device engages the container units on the platform, pushing them towards a moving discharge belt. This belt may be part of an unscrambler or other conveying system. During the above-described transferring operation, the empty carton is engaged by an ejector device and discharged from the supporting conveyor.

From the above brief description of the method of my invention, it is apparent that the carton itself engages certain devices which set into operation vacuum-control components performing the operations above mentioned. No predetermined setting of the cycle of operations is thus required of the structure of my apparatus, which will now be described in further detail.

Figure 3:
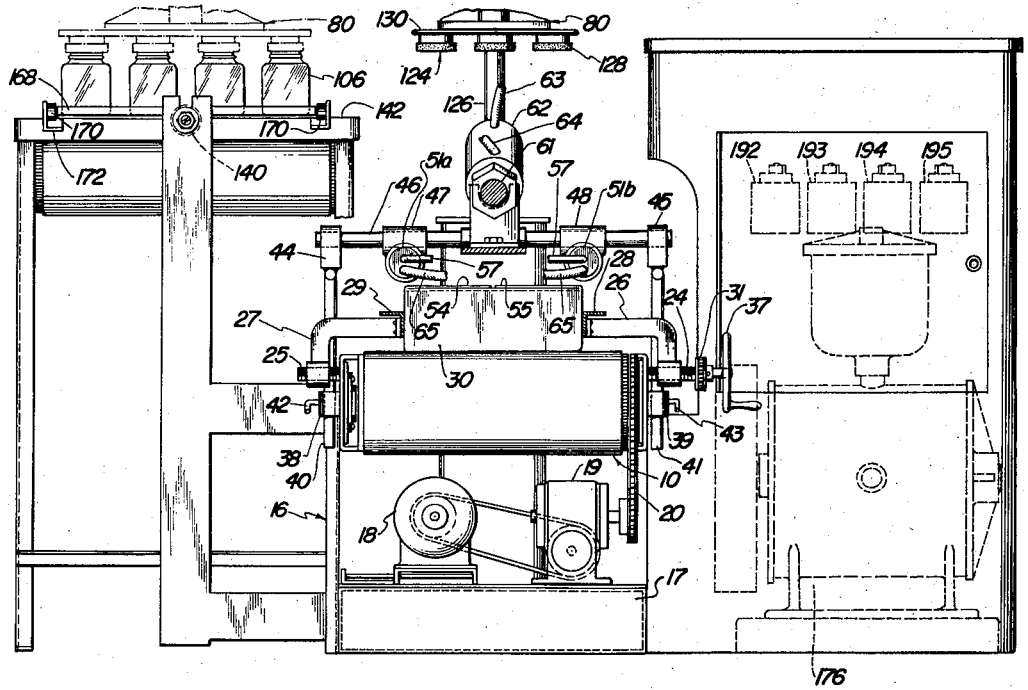
Fig. 3 is a front end view of Fig. 1 looking in the direction of arrows 3—3, portions being removed for clarity.

The structure illustrated contains an initial infeed or front conveyor 10 and a rear conveyor 11, these being operatively mounted on pulleys and rollers, in known manner, the shafts 12, 13, 14 and 15 associated with said conveyors 10 and 11 being operatively supported by the framework generally designated 16. The drive mechanisms for said conveyors 10 and 11 are of a conventional nature, the specific embodiment of my invention showing motors and speed reducing gears operatively mounted upon the base 17 of the structure. Motor 18 is shown connected to speed reducer 19 (Figs. 2 and 3, motor not shown in Fig. 2), a transmission chain 20 being shown operatively connecting the speed reducer to drive conveyor belt 10. Conveyor belt 11 is driven by transmission chain 21 also connected to a speed reducer (not shown) which in turn is connected to motor 22 (Fig. 2).

Figure 4:
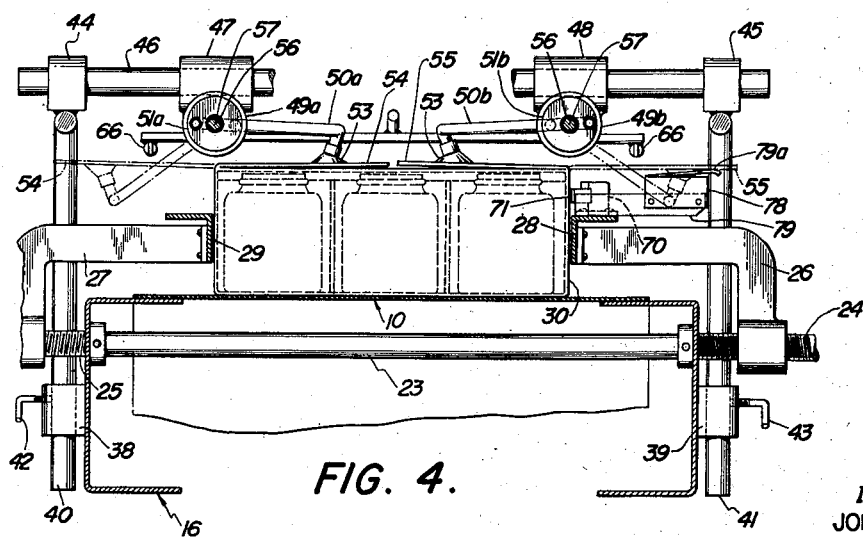
Fig. 4 is an enlarged section of Fig. 1 taken substantially along line 4—4, the side flap openers being shown by dot-dash lines in their respective retracted positions holding the side flaps in their respective open positions.

The framework 16 carries a transverse shaft 23, the opposite ends 24 and 25 of which are threaded in opposite directions (Fig. 4). Mounted over and in threaded engagement with said threaded portions 24 and 25 are the arms 26 and 27, these carrying the respective guide rails 28 and 29 between which cartons 30 are operatively moved by the said conveyors 10 and 11. Mounted over the end of said threaded portion 24, and affixed thereto, is the sprocket wheel 31 (Figs. 1 and 3), a chain 32 being mounted over another sprocket wheel 31a affixed to the threaded terminal portion 33 of a transverse shaft 23a, similar to said shaft 23, there being an opposite threaded terminal portion 34 threaded in a direction opposite to that of threaded portion 33. Mounted over said threaded portions 33 and 34 are the respective brackets 35 and 36—substantially like said brackets 26 and 27, the brackets 35 and 36 being similarly connected to the said guide rails 28 and 29. Affixed to said shaft 23 at the outer end thereof is the hand wheel 37. The arrangement is hence such that upon an operative rotation of hand wheel 37, the brackets 26, 27 and 35, 36 can be moved inwardly or outwardly, to bring the guide rails 28 and 29 correspondingly closer together or farther apart. In this manner the said guide rails 28 and 29 can serve to accommodate cartons of predetermined widths.

Also secured to the sides of said framework 16 are the two brackets 38 and 39 through which slidably extend the respective posts 40 and 41, the threaded keys 42 and 43, respectively, holding said posts 40 and 41 in selected positions, in known manner. Said posts 40 and 41 carry at the upper portions thereof the supports 44 and 45, the latter supporting the transverse rod 46 upon which are adjustably mounted the side flap opener brackets 47, 48. Said brackets 47 and 48 carry the respective casings 49a and 49b, which rotatably support and serve as bearings for the respective short shafts 51a and 51b. In the particular embodiment of said flap openers illustrated, two hollow tubular arms 50a and 50b are employed, the former comprising tube sections 50c and 50d, and the latter the tube sections 50e and 50f. Tube sections 50c and 50d are connected by a flexible pipe coupling 5, and tube sections 50e and 50f by the flexible pipe coupling 6. The said arms 50a and 50b extend through and are affixed to said respective shafts 51a and 51b, so that the operative rotation of shafts 51a and 51b will cause operative rotational movements of said arms 50a and 50b between their limiting retracted and projected positions, the terminal of each of said arms carrying a suction cup 53.

The arrangement is such that when the arms 50a and 50b are in their respective projected limiting positions (shown in full lines in Fig. 4), the suction cups 53 will be in operative engagement with the side flaps 54 and 55 of carton 30; and when said arms are in their operative retracted positions, they will be at the substantially diametrically opposite positions illustrated by the dot-dash lines of Fig. 4. In a manner to be hereinafter described, when the arms 50a and 50b are in their said projected positions, there is a suction induced within said arms, whereupon the suction cups 53 become fastened to said side flaps 54 and 55. When the arms 50a and 50b are operatively retracted, as shown in Fig. 4, they take with them the side flaps 54 and 55, and retain them in this position until the suction action is released. At such time, the flaps are engaged by a latch mechanism, to be hereinafter described, and are held in this position until the contents of the carton are removed at a subsequent station, and the carton discharged from the conveyor.

It is to be noted that the adjacent terminals of said tube sections 50c and 50d within the flexible coupling 5, and the adjacent terminals of said tube sections 50e and 50f within the flexible coupling 6 are in spaced relation, thereby permitting an angular adjustment between the respective section components of said arms 50a and 50b. It is further to be noted that the suction-cup members 53 are necessarily somewhat flexible, as are the said side flaps 54 and 55. It is because of the flexibility of the said couplings, the said suction cups and the said flaps that the flaps 54 and 55 and the said arms 50a and 50b can move in coactive relationship, despite the different axes of rotation of the flaps and the arms, in a manner well known to those skilled in the art.

Each of the said shafts 51a and 51b, extending through the respective casings 49a and 49b, is connected at the front terminal 56 thereof to flexible cable 57, each of these cables being in turn axially connected to shaft 58 over which is mounted gear 59. This gear is in engagement with rack 60 attached to piston rod 61 extending into cylinder 62. This cylinder is of conventional construction, having two conduits 63 and 64 communicating with opposite end portions thereof, whereby air or fluid alternately withdrawn from said conduits will actuate the piston rod 61 in opposite directions, in known manner, to cause reciprocating movements of the said rack 60. Solenoid valves are operatively associated with cylinder 62, in a manner to be hereinafter set forth. When the rod 61 is actuated in the direction of arrow A (Fig. 2), the gear 59 will be turned in a counter-clockwise direction, causing a corresponding turning movement of the flexible cables 57, corresponding rotational movements of shafts 51a and 51b, and corresponding movements of the tubular arms 50a and 50b towards their projected limiting positions shown in Fig. 4. It will be further observed that each of said tubular arms 50a and 50b is operatively connected with one of said conduits 65, the latter being connected to a suction supply line (177, Fig. 24), as will more clearly hereinafter appear. The arrangement is such that suction induced within conduits 65 will cause an evacuation of air from the hollow interiors of tubular arms 50a and 50b, thereby enabling the suction cups 53 to adhere to the side flaps 54 and 55 for the opening operation.

As aforesaid, when the said flaps 54 and 55 have swung into their open positions illustrated in Fig. 4, they are retained in place until the carton is disposed of. The devices for holding the flaps in this position are illustrated in Figs. 1, 2, 20, 21 and 22. These devices consist of two parallel bars 66 disposed slightly above the open position of said flaps, and laterally outwardly beyond the two said guide rails 28 and 29. At the forward portion of each of said bars is a latch member 67 pivotally mounted at 68 (Fig. 22), the latch being yieldably maintained in its upper position by the spring 69. When a flap, such as flap 54, is operatively swung outwardly from the inner dot-dash position shown in Fig. 21 to the outer dot-dash position in the direction B, the flap engages latch 67 and moves it downwardly, against the action of spring 69, to the dot-dash position (Fig. 22). The movement of the flap will continue until it snaps into position below the retracted position of latch 67, whereupon the latch will return to its normal position through the action of spring 69. The flaps 54 and 55 are disposed below the respective bars 66; and will generally, because of their resiliency, move upwardly and remain in slidable engagement therewith as the carton moves rearwardly in the direction of arrow C (Fig. 20).

Mounted on the guide rail 28 is the microswitch 70, the spring arm 71 of which protrudes inwardly so as to be engaged by the carton 30 as it is carried rearwardly by the said conveyor 10. Accordingly, when the said arm 71 is operatively depressed by the carton, it closes a circuit through a time-delay relay, to be hereinafter described, the latter actuating a solenoid valve operatively connected within said cylinder 62, and another solenoid valve controlling the vacuum through said conduits 65 (and thereby controlling the operative movement of said flap opener arms 50a and 50b and the suction action of said suction cups 53), all as will be more specifically hereinafter described. The said time-delay relay is set so that the suction cups 53 will be in contact with the flaps a predetermined period of time. Said arm 71 is maintained in its depressed condition while the carton is in its first station illustrated in Figs. 1 and 2. In this position said carton is in engagement with the roller stop 72. This stop is mounted on rod 73 which is connected to a piston within cylinder 74 operatively connected to a solenoid valve 75 and conduit 76. The said solenoid valve 75 is actuated through a microswitch in a manner to be hereinafter referred to, whereupon the stop will be lowered to the dot-dash position shown in Fig. 6. The top of the stop 72 contains a rotatably mounted roller 77, the arrangement being such that when the stop is in said lowered position, the carton will ride over the roller 77 as it is being moved rearwardly by the said conveyor 10.

Another microswitch 78 is mounted on adjustable bracket 79 attached to guard rail 28, this microswitch having an arm 79a which is engaged by flap 55 when it is in its open position (illustrated in Fig. 4). When arm 79a is operatively depressed, the suction in said conduit 65 is cut off, discontinuing the suction pull through suction cups 53, whereby the said flaps 54 and 55 are released.

Since the carton 30 is no longer held either by the said suction cups or stop 72, the rearward movement of conveyor 10 brings the said carton 30 on to the relatively fast moving conveyor 11, and this quickly brings the carton rearwardly to the second station under the lifting head 80 at the rear of the apparatus. The rear limiting position of the carton is determined by cross bar 81 serving as a rear stop. Mounted on this cross bar is the microswitch 82 having the forwardly protruding arm 83. When this arm is operatively depressed by carton 30, an electrical circuit is closed to another time-delay relay, to be hereinafter referred to. This latter relay sets into operation the following components: a solenoid valve for controlling the vacuum supply in the tubular end flap opener arms 84a and 84b, another solenoid valve for controlling the operative movement of said arms 84a and 84b, and still another solenoid valve for moving the clamp device 85 into operative position, as will more clearly hereinafter appear. Said tubular arms 84a and 84b have suction cups 85a as well as the coactive angularly adjustable sections 84c, 84d and 84e, 84f and flexible couplings 7 and 8, substantially like the corresponding parts described with reference to the said flap openers 50a and 50b. The operative movement of said arms 84a and 84b is between the retracted positions shown in full lines in Figs. 5, 6 and 7, and the projected positions shown by dot-dash lines in Fig. 5, the said suction cups 85a being engageable with the end flaps 86 and 87. Each of said tubular arms 84a and 84b is connected to a short shaft 88 in a casing 89, said shifts being operatively connected to flexible shaft 90 operatively associated with the gear 91 in engagement with rack 92—the latter being connected to the rod 93 extending into the cylinder 94. The conduits 95 and 96 are substantially like conduits 63 and 64 referred to with reference to said cylinder 62. A solenoid valve, operated in a manner to be hereinafter described, causes reciprocating movements of the rack 92 and consequential opening and closing movements of said arms 84a and 84b. The suction for cups 85a is supplied by the operative action of solenoid valve 97 connected through pipe 98 to conduits 99 which lead to said respective tubular arms 84a and 84b.

The length of time that the arms 84a and 84b are in their projected inner positions is determined by the setting of a time-delay relay, substantially in the manner in which movement of said arms 50a and 50b is controlled.

Mounted also on said cross bar 81 is the microswitch 100, this containing an arm 101 which is actuated by the end flap 86 when it is brought to its open position shown in Fig. 6. When said arm 101 is depressed, the circuit is closed through a solenoid controlling the operation of the partition insert hold-down device generally designated 102, and illustrated in Figs. 15 and 16. Simultaneously, two solenoid valves are operated controlling the vertical movement of the said vacuum head 80 and the supply of vacuum to said head for lifting the container units, as will hereinafter appear.

The said clamp 85 is mounted on piston rod 103 extending into the cylinder 104, actuated by suction controlled solenoid valve 190. Clamp 85 is in the form of an angle bar and is so positioned as to engage a forward corner of the carton 30, as illustrated in Figs. 1 and 5. This clamp accordingly holds the carton in proper position so that the moving belt therebelow will not throw it out of proper alignment with respect to the lifting head 80. Clamp 85 is actuated into its projected position when the microswitch 82 is actuated by carton 30, as aforesaid.

The said hold-down member 102 is adapted to prevent the partitioned insert or divider 105 (Fig. 15) from being lifted out when the container units 106 in the carton are being operatively removed by the lifting head (in a manner to be hereinafter described). The said insert 105 has conventional partitioned walls, in intersecting relation, to keep up the units 106 separated and in proper position within the carton 30. Two thin fingers 107 and 108 are disposed over the top of carton 30, said fingers being positioned substantially in the plane of the underlying transverse partition walls 109 and 110 respectively. The fingers 107 and 108 contain downwardly extending portions 111 (Fig. 16) with terminal portion 112 in engagement with the top edges of said transverse walls 109 and 110. Each of said fingers 107 and 108 is mounted upon and affixed to a bar 113 carrying cylindrical members 114 which are rotatably mounted within the terminals 115 of the bars 116 supported by the pipe 117, said pipe having a section 118 which supports the cylinder 119. Operatively disposed within said cylinder is a conventional piston, the rod 120 of which extends outwardly and is pivotally connected, by arm 121, with the said shaft 113.

Conduits 122 and 123 are operatively connected to the said cylinder 119; and by a solenoid valve arrangement, to be hereinafter referred to, the piston rod 120 is moved between the pivoted full line position (Figs. 15 and 16) to the dot-dash retracted position. In said latter position, the fingers 107 and 108 are brought into their retracted position illustrated in Fig. 16. When said fingers 107 and 108 are in their operative or holding position, they are in non-interfering relation to the suction members of the lifting head 80, in view of the spacing of the suction caps 124 carried by the lifting head.

The said lifting head 80 is detachably carried by an overhead arm 125 which rests upon and is secured to the top of the main piston rod 126 operatively associated with the main lifting cylinder 127. The said suction caps 124 in the form illustrated comprise a plurality of yieldable rings 128 mounted over the outlets 129 attached to the lifting head plate 130. Said outlets 129 and the suction caps 124 supported thereby are arranged in a plurality of parallel rows, spaced apart to correspond with the positioning of the container units 106 in the carton. Each of said outlets 129 is in communication with inner chamber 131 of said head 80, said chamber being in communication with the passageway 132 in arm 125, the latter passageway being in communication with conduit 133 connected to a suction line, to be hereinafter referred to.

The suction caps 124 are proportioned to fit over the open mouths of said container units 106, as illustrated in Fig. 9. The arrangement is such that when the said lifting head 80 is operatively lowered from the position of Fig. 6 to the full line position shown in Fig. 9, the suction caps 124 will envelope and snugly fit over the mouths of said container units 106. Hence, when a partial vacuum is created within the passageway 132 in lifting head 80, the air in container units 106 will be evacuated, so that when the said head 80 is operatively raised to the dot-dash position shown in Fig. 9 (directly over the full line position), it will carry upwardly therewith all of said container units 106—leaving behind any broken container units that may be within said carton 30.

As aforesaid, it is the operative actuation of microswitch 100 that closes a circuit to a solenoid valve whereby the passageway within the head 80 is brought into communication with a suction line for evacuating the container units 106. The operation of said microswitch 100 is also operatively connected to a solenoid valve which controls the vertical movement of the said main piston 126 and the head 80 carried thereby. A conduit 134, connected with the main suction line through the said last-mentioned solenoid valve, enters the top plate 135 for communication with the interior 136 of the main lifting cylinder 127 (see Figs. 17, 18, 19). Disposed within said cylinder is the piston 137, the latter carrying the said piston rod 126. The arrangement is such that the conduit 134 is normally in open communication with the main suction line and the said interior 136 of cylinder 127, maintaining a negative pressure within the cylinder, so that the piston 137 is normally maintained in a raised condition. But when the said microswitch 100 is operatively actuated, it shuts off communication between said interior 136 and the suction line, whereby the piston 137 and the lifting head 80 carried thereby are enabled to move downwardly by gravity. The stroke of the piston 137 is predetermined so that at the lowermost limiting position of the head 80 the said suction caps 124 will operatively engage the container units 106, as aforesaid.

It should at this time be noted that, in the form of apparatus illustrated, the said microswitch 100 is in series with another microswitch 138 mounted on the structural member 139 (Fig. 9) which supports the container unit push-off cylinder 140. For reasons which will more clearly hereafter appear, it is only when the said microswitch 138 is operatively actuated that the circuit can be closed through the solenoid valve controlling the lowering of the piston 137 and head 80.

Although the piping and electrical arrangements will be more fully described later on in this specification, it should be observed at this point that the evacuation of the air from the container units 106 is controlled by a conventional diaphragm type of vacuum switch, generally designated by reference number 141 in the piping diagram of Fig. 24. This type of diaphragm switch can be set to predetermined vacuum values, so that a predetermined degree of vacuum will close the switch and consequentially close a circuit associated therewith. The details of this construction are not described herein, since it is well known to those skilled in the art. In the present invention, this vacuum switch is set for a predetermined vacuum value which will provide sufficient suction to enable the head 80 to operatively lift up the said container units 106. When this point is reached, the vacuum switch is operatively closed, closing the circuit through the solenoid valve controlling the lifting of the main piston 137 and lifting head 80. When said head 80, carrying the adhering container units 106, is in its upper limiting position directly above the carton 30, said units are above the level of the unloading platform 142—said platform being positioned at one side of the main cylinder 127 and in alignment with the discharge belt 143. In its uppermost position the piston 137 causes the actuation of another microswitch which sets into motion other components for performing certain steps. One of such steps is the rotation of the cylinder 127 and the lifting head 80 through an arc of 90° to a position over the said unloading platform 142. As will be seen from Fig. 18, the main piston 137 carries an upwardly extending rod 144, the latter being positioned and proportioned to engage the downwardly extending plunger 145 of the microswitch 146. When the rod 144 engages plunger 145 upon the upward stroke of piston 137, the plunger 145 will actuate the microswitch 146, closing the circuit to another time-delay relay, the latter controlling electrical circuits operatively connected with the following: the turning cylinder 147 (for turning the main cylinder 127), the cylinder 104 operatively connected to the clamp 103, the solenoid valve controlling the vacuum in the end flap opener suction cups 85a, and the carton ejector cylinder 148 to be hereinafter described.

The said last-mentioned time-delay relay is set for a predetermined time, so as to control the period of time that the main cylinder 127 and lifting head 80 are turned and maintained in their respective turned positions while unloading the container units 106 onto the unloading platform 142. The same relay simultaneously closes a circuit through the solenoid valve operatively associated with the clamp cylinder 104, causing it to return to its normal retracted position out of engagement and out of the path of carton 30. The relay also closes a circuit through the said end flap suction cups 85a, as aforesaid, so that the end flaps 86 and 87 are also released, thereby permitting the carton 30 to be operatively removed from its station. The release of said flaps will also remove the pressure upon arm 101 of said microswitch 100, thereby opening the circuit controlling the solenoid valve operatively associated with cylinder 119 connected to the partition insert hold-down device 102—and when this occurs, the said hold-down fingers 107 and 108 return to their normal retracted positions shown by dot-dash lines in Fig. 16.

The way is now clear for the carton ejector cylinder 148 to perform its function. This is accomplished only after the microswitch 149 adjacent the base of main cylinder 127 is actuated. This microswitch, normally closed, is mounted on the structure 150, and is actuated by the bottom plate 151 supporting said main cylinder 127. Said bottom plate 151 rotatably rests upon the base 152, so that the plate and cylinder 127 are simultaneously rotatably operated. Said bottom plate 151 contains the radial extension 153 having therein a slot 154. Extending upwardly into the slot and in engagement with the lateral walls thereof is the pin 155 secured to said cylinder 147. When the piston 156 is operatively moved by the suction action within cylinder 147, said extension 153 and its bottom plate 151, together with cylinder 127, will be correspondingly operatively rotated, the projected position of said extension 153 being shown by dot-dash lines in Fig. 10. It should be noted that the conduits 157 and 158 operatively communicate with cylinder 147 and with the main suction supply line to be hereinafter described.

The said bottom plate 151 contains outwardly extending corner portions 159, these being proportioned and positioned to engage the roller 160 of the microswitch 149 and push the arm supporting said roller inwardly. One of said corner portions 159 is in engagement with said roller 160 when the cylinder 147 and extension 153 are in their retracted positions (Fig. 10). In this position the microswitch 149 is in its circuit-opening position. As the piston 156 begins its operative turning movement (towards the unloading platform 142), the contacting corner portion 159 passes to a position out of engagement with said roller 160, thereby releasing the arm carrying the roller to the roller dot-dash position shown in Fig. 10—and thus closing the circuit through microswitch 149. As will be seen from the wiring diagram of Fig. 25, said microswitch 149 is in series with the time-delay relay (195) controlling the action of the carton ejector cylinder 148. It is for this reason that when the microswitch 149 is operatively closed, in the manner aforesaid, the said carton ejector mechanism begins to operate.

A conduit 161 is connected between the said suction supply line and the valve controlling the operation of the piston within cylinder 148, this piston being connected to the piston rod 162, the terminal of which carries the push-off plate 163. As the piston rod 162 is operatively moved forwardly, the carton 30 is pushed off to a position out of the path of the conveyor 11.

When the cylinder 127 and extension 153 have completed their turn, with the lifting head 80 over the unloading platform 142, the parts have been rotated 90°, as aforesaid. At this position the corner portion 159a (Fig. 10) of bottom plate 151 will necessarily be in engagement with the roller 160 to open the circuit through microswitch 149. When this occurs, carton ejector rod 162 is moved into its projected position—at which point the microswitch 164, adjacent cylinder 148, is actuated by the recessed portion 165 of rod 162 when the latter has reached the end of its forward stroke (Fig. 13). In other words, the arm of microswitch 164 is released by recess 165, to close a circuit through the solenoid valve which causes the return of piston rod 162 to its retracted position—this being possible because microswitch 149 (controlling the forward movement of rod 162) is in its open position.

Mounted on the structure 150 in the path of extension 153 (Fig. 10) is the microswitch 166 which is actuated by said extension 153 at the completion of its 90° turn. This microswitch controls the suction cut-off to the lifting head 80 through a solenoid valve operatively connected to said conduit 133; and it also controls a solenoid valve operatively associated with the container unit push-off cylinder 140. When microswitch 166 is operatively actuated, the suction in the lifting head 80 is discontinued, resulting in the release of container units 106 from the head and the depositing of these units upon the unloading platform 142. The closing of microswitch 166 also causes the push-off piston 167 to move to its projected position shown by dot-dash lines in Figs. 8 and 9. Said piston has a push plate 168 secured thereto, the forward edge 169 being engageable with the container units 106 operatively positioned on unloading platform 142. Hence, when the piston rod 167 and push plate 168 are operatively moved into their projected positions, the container units 106 are slidably transferred from unloading platform 142 to the discharge belt 143. It will be observed that the push plate 168 contains at the forward edge 169 thereof two rollers 170, these being movable over the unloading platform 142 for easy action. The plate 168 is pivotally mounted at 171 upon the piston rod 167 to enable a pivotal movement of plate 168 as it moves upwardly along inclined portion 172 of the unloading platform 142.

A microswitch 173 is mounted below the said unloading platform 142, this microswitch being engaged by the finger 174 of push plate 168 when the push-off piston rod 167 is at the end of its operative stroke, as illustrated by the dot-dash lines in Fig. 9. This closes an electrical circuit through the solenoid valve operatively associated with the conduit 175 connecting the main suction supply line with push-off cylinder 140—thereby causing a return movement of piston rod 167 to its fully retracted position shown in Figs. 8, 9 and 23. In this retracted position the said finger 174 actuates the said microswitch 138; and since this, as aforesaid, is in series with microswitch 100, the latter switch becomes effective to close the circuit controlled by it for performing the functions hereinabove mentioned.

This arrangement provides a safety feature, to prevent depositing container units 106 on the unloading platform 142 when previously deposited units have not been operatively removed. This is due to the fact that the piston rod 167 and pusher plate 168 would not be able to complete their operative stroke if there were container units obstructing said unloading platform, such as would occur, for example, if the discharge belt 143 were not properly operating. Such an incompleted stroke would make it impossible for the finger 174 to contact the microswitch 173; and hence there could be no operative return stroke of piston rod 167—thereby making it impossible for finger 174 to actuate microswitch 138. Since, as aforesaid, microswitch 138 is in series with microswitch 100, the non-operation of microswitch 138 would prevent an operation of the parts operatively connected to microswitch 100. Hence, under such conditions, the lifting head 80 would not be able to descend to its lowermost position for picking up a new load of container units.

The said microswitch 164 operatively associated with the carton ejector rod 162 is also connected to the circuit controlling the said solenoid valve 75 associated with the roller stop cylinder 74. Hence, when the microswitch 164 is operatively actuated by element 165 on carton ejector rod 162, the piston rod 73 associated with cylinder 74 is retracted, to lower the roller stop 72 to an unobstructing position, whereby the carton that has been engaged thereby will be permitted to move rearwardly toward the conveyor 11. Since conveyor 11 operates at a more rapid speed than conveyor 10, it will quickly pull the carton 30 away from conveyor 10, so as to form a gap between the last-mentioned carton and the new one operatively disposed on conveyor 10. The actuation of microswitch 70 by the new carton, in the manner above-described, will cause the roller stop 72 to rise to its operative position and keep the said new carton on conveyor 10 at its first operative position, substantially in the manner described hereinabove.

In the above description, reference has been made to solenoid valves, time-delay relays, vacuum-operated cylinders with pistons for actuating certain components of my apparatus, suction supply lines and associated devices. Many of these parts are of conventional construction, and detailed descriptions of them have not been given, since they are well known and understood by those skilled in the art. For clarification purposes these devices are shown, in Fig. 24, in relation to each other and to the entire apparatus.

A pump 176, is operatively connected to a pipe 177 which serves as the main suction supply line for other pipes and conduits connected to various solenoid valves, these being connected either to cylinders for operating pistons, or to outlets for air evacuation purposes. Some of said valves are of the "single solenoid" type, and others of the "double solenoid type." The single solenoid valves are of the conventional spring return type which, when energized, moves an internal valve to change the flow of air (or the "vacuum supply") from one port to another, against the action of the spring; and after deenergization, the valve returns to its normal spring-held position. This type of valve is employed where a change of the vacuum supply is needed for only a short period of time. In the double solenoid valve construction, there are two separate solenoids that, when energized, move in opposite directions to open and close an internal valve. This type requires only a momentary energization, whereafter the valve remains in its actuated position, open or closed.

Side flap opener cylinder 62 is operatively connected by pipes 63 and 64 to the single solenoid valve 178, which is connected by pipe 179 to the supply line 177. When solenoid 178 is operatively energized, air is withdrawn from pipe 63, and the rack 60 is moved in the direction of the arrow, to swing the side flap opener arms 50a and 50b inwardly, in the manner hereinabove explained. When the solenoid valve 178 is deenergized, pipe 63 is cut off from the vacuum supply, and pipe 64 is brought into communication with such supply, thereby causing a retraction of rack 60.

Similar solenoid valve controls are employed in connection with divider hold-down cylinder 119, end-flap opener cylinder 94 and turning cylinder 147. Single solenoid valve 180 operatively connects the supply line 177 with said cylinder 119; single solenoid valve 181 connects cylinder 94 with the supply line 177; and single solenoid valve 182 connects the supply line 177 with cylinder 147. All these connections are effectuated through pipes schematicaly shown in Fig. 24.

The double solenoid valve 183 is operatively movable between open and closed positions, whereby vacuum connections are operatively established, intermittently, between the supply line 177 and pipes 65 communicating with suction cups 53. In similar manner, double solenoid valve 97 communicates with suction cups 85a through pipes 98 and 99.

A single solenoid valve 185 intermittently connects the vacuum supply line 177 with main cylinder 127 through the pipe 134, when said solenoid valve 185 is operatively actuated.

The said vacuum switch 141 contains the double solenoid valve 186 which is operatively connected, through pipe 133 and arm 125, with the vacuum head 80 and the suction caps 124, shown in Fig. 6 and other figures. Disposed within member 187 associated with solenoid valve 186 is the vacuum actuated diaphragm hereinabove referred to, this being responsive to a predetermined vacuum, in known manner. Hence when such vacuum is attained, the conventional diaphragm within member 187 closes the switch therein, said switch being in a circuit operatively connected with solenoid valve 185 for lifting the vacuum head.

Cylinder 140, for actuating the push-off plate 168, is operatively associated with the "valve-in-head" double solenoid 188. Communicating between opposite ends of cylinder 140 is pipe 189. The arrangement is such that in one position of the solenoid valve member 188, the vacuum supply is in one end of the cylinder, and in the other position the valve is moved so as to transfer the vacuum supply to the other end of the cylinder, in this manner causing opposite operative movements of the piston rod 167. The conduit 175 operatively connects the solenoid valve 188 with supply line 177. The said pipe 175 also supplies vacuum through the valve-in-head solenoids 190 and 75 to their respective cylinders 104 and 74, whereby the clamp 85 and the roller stop 72 are similarly operatively actuated. The carton ejector cylinder 148 also has a valve-in-head solenoid 191 which is connected to supply line 177 by pipe 161.

It is thus apparent that the main components of my apparatus performing their respective functions above described are actuated by suction means connected to a vacuum pump 176—the suction actuating solenoids which perform their respective functions by the operative energization of the respective solenoids.

The wiring diagram of Fig. 25 shows the connections between the various solenoids, microswitches, time-delay relays and sources of current supply.

The time-delay relays, identified by reference numerals 192, 193, 194 and 195, are of conventional construction, having the function of starting a time-delay upon energization. The construction is such that a coil in each is energized by certain of the microswitches hereinabove referred to, whereupon circuits connecting the various solenoid valves are closed.

By referring to the wiring diagram of Fig. 25 it will be seen that when the arm 71 of microswitch 70 is operatively depressed (by the carton 30), an electrical circuit to the coil of relay 193 is closed. As will be seen from the wiring connections illustrated, the energization of the relay closes the circuit, for a predetermined period of time, through the solenoid valve 178 (controlling the motion of the side flap openers 50a and 50b); and at the same time, the solenoid valve 183 (furnishing vacuum supply to suction cups 53) is operatively actuated. When said arm 71 is operatively released by the carton, another normally closed internal circuit of microswitch 70 energizes relay 192, closing the circuit through solenoid valve 75 of the roller stop 72. When this occurs, the roller stop is raised to its operative position, to receive thereagainst the next advancing carton.

Microswitch 82 is electrically connected to relay 194, so that when the microswitch 82 is operatively actuated, it energizes relay 194, whereupon circuits are closed through solenoid valve 181 (controlling the motion of the end flap openers 84a and 84b), solenoid valve 184 (controlling the vacuum supply to suction cups 85a), and solenoid valve 190 (controlling the forward or holding motion of clamp 85).

Microswitch 146 is electrically connected to relay 195, so that when the microswitch is actuated, it energizes the coil of said relay to close the circuit of the following: solenoid valve 182 (controlling the turning movement of main cylinder 127 and the vacuum lifting head 80, and the dwell over the unloading platform), the solenoid valve 190 (to effect the retraction of clamp 85), solenoid valve 184 (to cut off the vacuum supply to suction cups 85a) and solenoid valve 191 (for operating the carton ejector 162).

Microswitch 149 is connected in series with relay 195 and solenoid valve 191 (controlling the carton ejector), thereby assuring that the ejector rod 162 is not actuated before the suction cups 85a are operatively released and the clamp 85 retracted. It is also to be noted that when the contacts of the normally closed microswitch 149 are permitted to close, the relay 195 is energized, thereby causing an operative actuation of carton ejector rod 162.

It is apparent that by the method and apparatus of my invention above described, various operations are performed in sequence without the need of presetting complicated timing mechanisms, as is necessary in conventional devices. The carton itself, during its advancing movements and the opening of its flaps, is effective in setting into motion subsequent operative steps. In other words, the carton itself sets up operations after it is first deposited on the initial conveyor.

It is further to be noted that the carton is deposited right side up, without any need to employ complicated turning or reversing mechanisms.

It is of particular importance to note that any container units that are broken, and therefore cannot support a vacuum, will not be lifted by the lifting head, but will remain in the carton, without in any way interfering with the operation of the apparatus.

The entire mechanism, once adjustments are made for size, operates automatically from the first step right through the discharge of the units onto a suitable takeaway mechanism.

In the above description, the invention has been disclosed merely by way of example and in a preferred manner; but obviously many variations and modifications may be made therein. It is to be understood, therefore, that the invention is not limited to any specific form or manner of practicing the same, except insofar as such limitations are specified in the appended claims.

I claim:

1. In an apparatus for unloading a closed carton containing a plurality of container units therein and having overlapping inner and outer closure flaps, the combination of a first conveyor; a second conveyor in longitudinal alignment therewith, a retractable stop adjacent a predetermined first station along the path of said first conveyor and movable between a projected position above said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, means to open said valve means when said respective arms are in their said projected positions and during their movements to their said respective retracted positions, whereby said cups will adhere to said respective engaged flaps during the operative retracting movement of said arms, means to close said valve means while said respective arms are in their respective retracted positions, whereby said cups will release said respective flaps, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge position, and means to disconnect said suction means from said apertured portions when said lifting head is in said last-mentioned position, whereby the container units will be released upon said discharge platform.

2. In an apparatus for transferring an article from a predetermined unloading station to an adjacent discharge platform, the combination according to claim 1, said second conveyor being operative at a greater speed than said first conveyor.

3. In an apparatus for transferring an article from a predetermined unloading station to an adjacent discharge platform, the combination according to claim 1, said respective suction arms being swingably movable between their respective retracted and projected positions, a pivotal mounting for each of said arms, and rotary actuating means operatively connected to said arms.

4. In an apparatus for transferring an article from a predetermined unloading station to an adjacent discharge platform, the combination according to claim 1, said respective suction arms being swingably movable between their respective retracted and projected positions, a pivotal mounting for each of said arms, rotary actuating means operatively connected to said arms, said arms each having an internal passageway extending longitudinally thereof, said suction cups being at the ends of said respective arms and in communication with said respective passageways, and air exhaust means operatively connected to said passageways.

5. In an apparatus for unloading a closed carton containing a plurality of container units therein and having overlapping inner and outer closure flaps, the combination of a first conveyor, a second conveyor in longitudinal alignment therewith, a retractable stop adjacent a predetermined first station along the path of said first conveyor and movable between a projected position above said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said second arms having thereon suction cups proportioned and positioned operatively to engage said inner flaps when said arms are in their said projected positions and said carton is at said second station, a suction pipe line operatively connected with said respective arms and cups, valve means between said line and said respective arms, valve opening means operatively connected to said respective valve means, whereby when said cups are in operative engagement with said respective flaps said cups will adhere to said flaps, valve closing means operatively connected to said respective valve means, to release said flaps from said respective cups, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge positions, means to disconnect said suction means from said apertured portions when said lifting head is in said last-mentioned position, whereby the container units will be released upon said discharge platform, a discharge conveyor adjacent said discharge platform, a pusher movable along a path extending across said discharge platform to said discharge conveyor, and means to actuate said pusher.

6. In an apparatus for unloading a closed carton containing a plurality of container units therein and having overlapping inner and outer closure flaps, the combination of a first conveyor, a second conveyor in longitudinal alignment therewith, a retractable stop adjacent a predetermined first station along the path of said first conveyor and movable between a projected position above said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, valve opening means operatively connected to said respective valve means, whereby when said cups are in operative engagement with said respective flaps said cups will adhere to said flaps, valve closing means operatively connected to said respective valve means, to release said flaps from said respective cups, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge positions, means to disconnect said suction means from said apertured portions when said lifting head is in said last-mentioned poistion, whereby the container units will be released upon said discharge platform, a carton ejector movable along a path extending transversely across said second station, and means to actuate said ejector.

7. In an apparatus for unloading a closed carton containing a plurality of container units therein and having overlapping inner and outer closure flaps, the combination according to claim 5, electro-mechanical means operatively connected to said valve opening means associated with the valve means of said first suction arms, and switch means in and adjacent the path of said first conveyor and operatively connected to said electro-mechanical means, said switch means being positioned for operative engagement with said carton when the latter is operatively disposed on said first conveyor.

8. In an apparatus for unloading a closed carton containing a plurality of container units therein and having overlapping inner and outer closure flaps, the combination according to claim 5, electro-mechanical means operatively connected to said valve closing means associated with the valve means of said first suction arms, switch means in the path of one of said outer flaps operatively adhering to one of said first suction arms during the operative movement of said latter arm from its said inner projected position to its said outer retracted position, whereby said switch means will be operatively actuated by said flap.

9. In an apparatus for unloading a closed carton containing a plurality of container units therein and having overlapping inner and outer closure flaps, the combination of a first conveyor, a second conveyor in longitudinal alignment therewith, a retractable stop adjacent a predetermined first station along the path of said first conveyor and movable between a projected position above said first conveyor and a retracted position no higher than the level of said first conveyor, elevating means for said stop, retracting means for said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, valve opening means operatively connected to said respective valve means, whereby when said cups are in operative engagement with said respective flaps said cups will adhere to said flaps, valve closing means operatively connected to said respective valve means, to release said flaps from said respective cups, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge positions, means to disconnect said suction means from said apertured portions when said lifting head is in said last-mentioned position, whereby the container units will be released upon said discharge platform, electro-mechanical means operatively connected to said stop elevating means, and switch means in and adjacent the path of said first conveyor and operatively connected to said electro-mechanical means, said switch means being positioned for operative engagement with said carton when the latter is operatively disposed on said first conveyor.

10. In an apparatus for unloading a closed carton containing a plurality of container units therein and having overlapping inner and outer closure flaps, the combination of a first conveyor, a second conveyor in longitudinal alignment therewith, a retractable stop adjacent a predetermined first station along the path of said first conveyor and movable between a projected position above said first conveyor and a retracted position no higher than the level of said first conveyor, elevating means for said stop, retracting means for said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, valve opening means operatively connected to said respective valve means, whereby when said cups are in operative engagement with said respective flaps said cups will adhere to said flaps, valve closing means operatively connected to said respective valve means, to release said flaps from said respective cups, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge position, means to disconnect said suction means from said apertured portions when said lifting head is in said last-mentioned position, whereby the container units will be released upon said discharge platform, a carton ejector movable along a path extending transversely across said second station, means to actuate said ejector, electro-mechanical means operatively connected to said stop retracting means, and switch means in the path of said carton ejector and operatively connected to said last-mentioned electro-mechanical means, said switch means being operatively engageable by said carton ejector during its operative movement.

11. In an apparatus for unloading a closed carton containing a plurality of container units therein and having overlapping inner and outer closure flaps, the combination according to claim 5, electro-mechanical means operatively connected to said valve-opening means associated with the valve means of said second suction arms, switch means at said second station and adjacent said second conveyor and operatively connected to said electro-mechanical means, said switch means being positioned for operative engagement with said carton when the latter is operatively disposed at said second station.

12. In an apparatus for unloading a closed carton containing a plurality of container units therein and having overlapping inner and outer closure flaps, the combination of a first conveyor, a second conveyor in longitudinal alignment therewith, a retractable stop adjacent a predetermined first station along the path of said first conveyor and movable between a projected position above said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, means to open said valve means when said respective arms are in their said projected positions and during their movements to their said respective retracted positions, whereby said cups will adhere to said respective engaged flaps during the operative retracting movement of said arms, means to close said valve means while said respective arms are in their respective retracted positions, whereby said cups will release said respective flaps, a vertically movable vacuum lifting head above said second station and movable between upper and lower limiting positions, vertical actuating means for moving said head between said limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, rotary means for rotating said head between said two last-mentioned positions, suction means connected to said apertured portions for creating a partial vacuum within said apertured portions while the head is in its said lower position and during its movement to its said discharge positions, means to disconnect said suction means from said apertured portions when said lifting head is in said last-mentioned position, whereby the container units will be released upon said discharge platform, electro-mechanical means operatively connected with said vertical actuating means, and switch means in the path of one of said inner flaps which is operatively adhering to one of said second suction arms during the operative movement of said latter arm from its said inner projected position to its said outer projected position, whereby said switch means will be operatively actuated by said flap.

13. In an apparatus for unloading a closed carton containing a plurality of container units therein separated by the walls of a partition insert and having overlapping inner and outer closure flaps, the combination of a first conveyor, a second conveyor in longitudinal alignment therewith, a retractable stop adjacent a predetermined first station along the path of said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flap when said arms are in their said projected positions and said carton is at said second station, a suction pipe line operatively connected with said respective arms and cups, valve means between said line and said respective arms, means to open said valve means when said respective arms are in their said projected positions and during their movements to their said respective retracted positions, whereby said cups will adhere to said respective engaged flaps during the operative retracting movement of said arms, means to close said valve means while said respective arms are in their respective retracted positions, whereby said cups will release said respective flaps, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge positions, means to disconnect said suction means from said apertured portions when said lifting head is in said last-mentioned position, whereby the container units will be released upon said discharge platform, a retractable hold-down member positioned for engagement with the top of said partition insert, operating means for actuating said member, electro-mechanical means operatively connected with said last-mentioned operating means, and switch means in the path of one of said inner flaps which is operatively adhering to one of said second suction arms during the operative movement of said latter arm from its said inner projected position to its said outer projected position, whereby said switch means will be operatively actuated by said flap.

14. In an apparatus for unloading a closed carton containing a plurality of container units therein separated by the walls of a partition insert and having overlapping inner and outer closure flaps, the combination according to claim 13, said hold-down member having an arm proportioned and positioned for engagement with the top edge of one of said walls of the partition insert, said arm being operatively movable substantially within the plane of said wall.

15. In an apparatus for unloading a closed carton containing a plurality of container units therein separated by the walls of a partition insert and having overlapping inner and outer closure flaps, the combination of a first conveyor, a second conveyor in longitudinal alignment therewith, a retractable stop adjacent a predetermined first station along the path of said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, means to open said valve means when said respective arms are in their said projected positions and during their movements to their said respective retracted positions, whereby said cups will adhere to said respective engaged flaps during the operative retracting movement of said arms, means to close said valve means while said respective arms are in their respective retracted positions, whereby said cups will release said respective flaps, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge position, means to disconnect said suction means from said apertured portions when said lifting head is in said last-mentioned position, whereby the container units will be released upon said discharge platform, a retractable clamp member positioned and proportioned for engagement with a forward facing corner of said carton when it is operatively disposed at said second station, electro-mechanical means operatively connected to said clamp member, switch means at said second station and operatively connected to said electro-mechanical means, said switch means being positioned for operative engagement with said carton when the latter is operatively disposed at said second station, whereby said switch means will be operatively actuated by said carton.

16. In an apparatus for unloading a closed carton containing a plurality of container units therein and having overlapping inner and outer closure flaps, the combination of a first conveyor, a second conveyor in longitudinal alignment therewith, a retractable stop adjacent a predetermined first station along the path of said first conveyor and movable between a projected position above said first conveyor and a retracted position no higher than the level of said first conveyor, means to operatively actuate said stop, first suction arms adjacent said first station and movable between an outer retracted position and an inner projected position, said arms having thereon suction cups proportioned and positioned operatively to engage said outer flaps when said arms are in their said projected positions and said carton is at said first station, second suction arms disposed rearwardly beyond said first arms adjacent a predetermined second station and movable between an outer retracted position and an inner projected position, said latter arms having thereon suction cups proportioned and positioned operatively to engage said inner flaps when said arms are in their said projected positions and said carton is at said second station, a suction pipe line operatively connected with said respective arms and cups, valve means between said line and said respective arms, means to open said valve means when said respective arms are in their said projected positions and during their movements to their said respective retracted positions, whereby said cups will adhere to said respective engaged flaps during the operative retracting movement of said arms, means to close said valve means while said respective arms are in their respective retracted positions, whereby said cups will release said respective flaps, two flap retainer bars on opposite sides of said conveyors and extending between said first and second stations, said bars being disposed outwardly beyond said conveyors and over said outer flaps when in their operatively open positions during the operative movement of the carton between said first and second stations, a vertically movable vacuum lifting head above said second station and movable between upper and lower limiting positions, said head containing thereon apertured portions positioned and proportioned for engagement with said container units when said head is at its said lower position and said carton is at said second station, a discharge platform adjacent said second station, said suction head being revolvable between its said position above said second station and a predetermined discharge position over said discharge platform, means to operatively actuate said suction lifting head, suction means connected to said apertured portions for creating a partial vacuum within said apertured portions while the head is in its said lower position and during its movement to its said discharge positions, and means to disconnect said suction means from said apertured portions when said lifting head is in said last-mentioned position, whereby the container units will be released upon said discharge platform.

References Cited in the file of this patent

UNITED STATES PATENTS

| | | |
|---|---|---|
| 2,119,725 | Stecher | June 7, 1938 |
| 2,253,283 | Minaker | Aug. 19, 1941 |
| 2,301,892 | Lewis | Nov. 10, 1942 |
| 2,597,387 | Seidel et al. | May 20, 1952 |
| 2,628,732 | Griswold | Feb. 17, 1953 |
| 2,656,060 | Fischer et al. | Oct. 20, 1953 |
| 2,665,013 | Socke | Jan. 5, 1954 |
| 2,685,975 | Bruce et al. | Aug. 10, 1954 |

FOREIGN PATENTS

| | | |
|---|---|---|
| 1,093,458 | France | Nov. 24, 1954 |